United States Patent Office 3,165,654
Patented Jan. 12, 1965

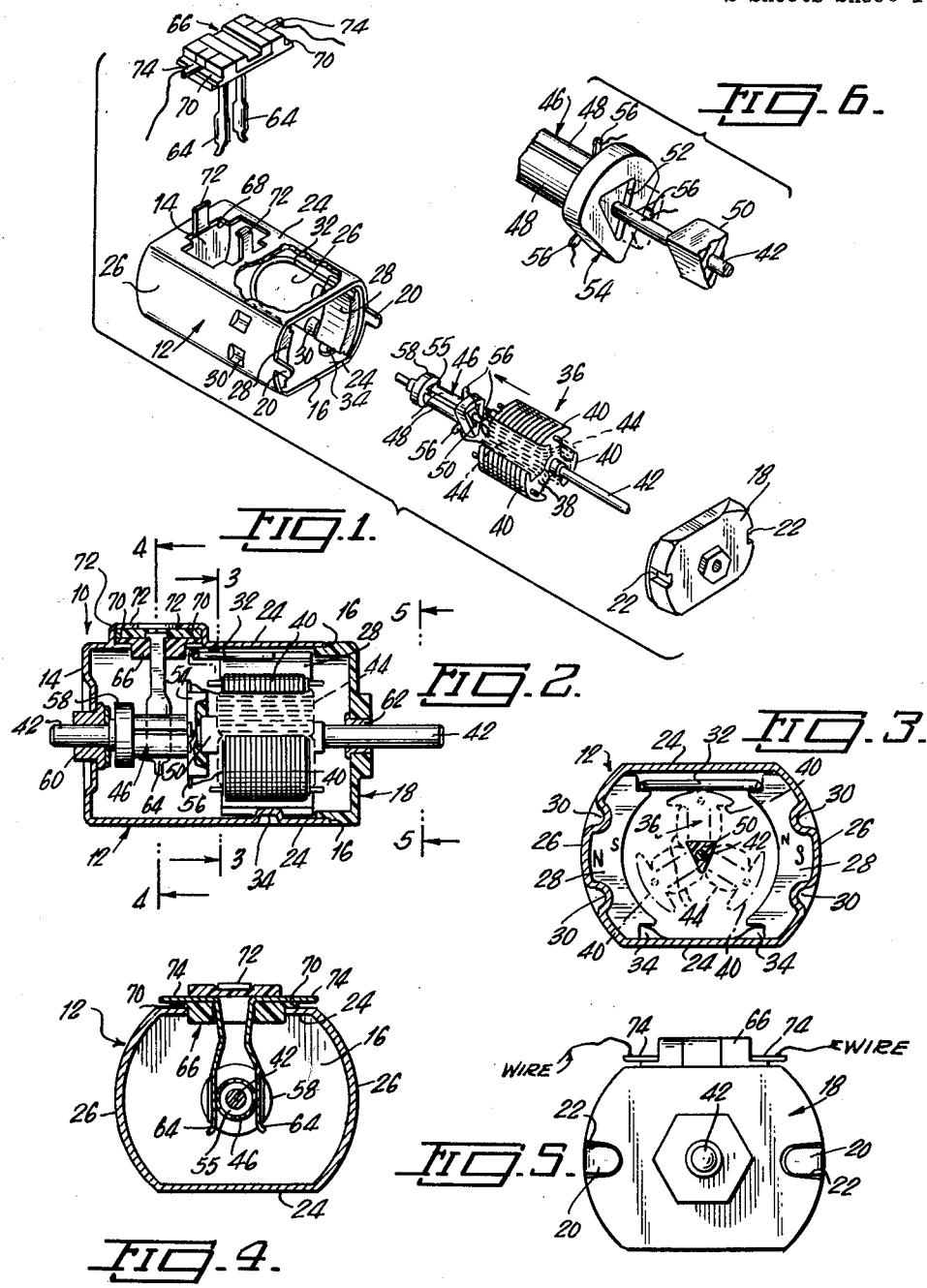

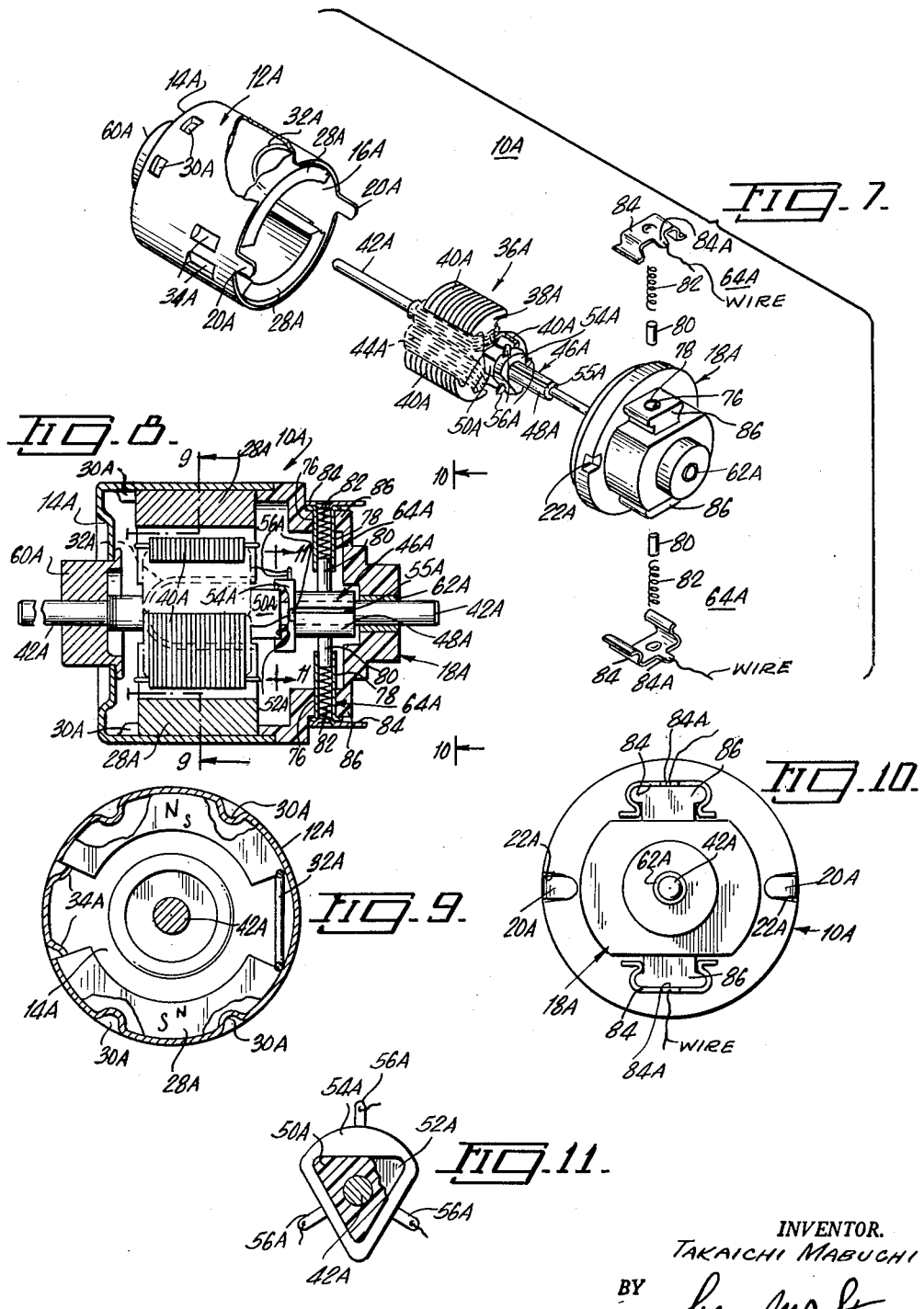

3,165,654
MINIATURE ELECTRIC MOTORS
Takaichi Mabuchi, 104 Hondemachi, Katsushika-ku, Tokyo, Japan
Filed Feb. 17, 1960, Ser. No. 9,331
5 Claims. (Cl. 310—46)

The present invention relates to a miniature electric motor.

It is an object of the present invention to provide means contributing to a miniature electric motor which affords highly reliable and consistent performance.

It is another object of the invention to provide means resulting in a miniature electric motor having a higher power and efficiency to weight ratio.

It is another object of the invention to provide means conducive to a highly economical and durable structure of a miniature electric motor yielding relatively high r.p.m. at minimized current drain.

It is a further object of the invention to provide means aiming at a very effacious miniature electric motor assembly which guarantees a long life of operation, is of comparatively rugged construction and in which substantially all the magnetic flux generated by magnet means is utilized to result in an increased output of the motor.

It is still a further object of the invention to provide means aiding in automatically aligning correct positioning of the commutator to thereby insure friction-free and smooth operation at all times.

Yet a further object of the invention resides in the provision of means affording easy assembly and disassembly of the few parts of which the motor consists, the casing or housing for the motor serving to anchor certain stationary parts of the motor in place therein.

These and other objects of the invention will become further apparent from the following detailed description, reference being made to the accompanying drawings.

In the drawings which illustrate the best modes presently contemplated for carrying out the invention:

FIG. 1 is an exploded perspective view of a miniature electric motor pursuant to the present invention;

FIG. 2 is a longitudinal sectional view of the motor;

FIGS. 3 and 4 are cross-sectional views taken on the lines 3—3 and 4—4, respectively, of FIG. 2;

FIG. 5 is an end view taken in the direction of line 5—5 of FIG. 2;

FIG. 6 is a fragmentary view of the commutator;

FIG. 7 is an exploded perspective view of a miniature motor pursuant to another embodiment of the invention;

FIG. 8 is a longitudinal sectional view of the motor shown in FIG. 7;

FIG. 9 is a sectional view taken on the line 9—9 of FIG. 8;

FIG. 10 is an end view taken in the direction of line 10—10 of FIG. 8; and

FIG. 11 is a fragmentary sectional view taken along line 11—11 of FIG. 8.

Referring now to FIGS. 1–6 of the drawings in detail, there is shown a miniature direct-current electric motor 10, pursuant to the present invention. The motor is provided with a tubular housing or casing 12 of permeable material or metal. The casing is closed at one end thereof by an integral end wall 14. The other end 16 of the casing is open and is adapted to receive a closure cap 18, preferably formed of a suitable plastic or suitable plastic composition material.

For this purpose, the casing is provided with bendable tabs 20—20 adapted to be pushed into and received in recesses 22—22 defined in said cap, as best shown in FIG. 5. The casing 12 is provided with two opposing integral substantially planar walls 24—24 and with two opposing integral arcuate walls 26—26.

Permanent arc-shaped magnets 28—28 facing each other and made of ferrite material having opposite polarities are mounted on the inner surface of the opposing arcuate walls 26—26, being retained in a predetermined position by recessed wall portions 30 which engage in complementary detents formed in the magnets and by retainer or tongue elements 32 and 34, as best shown in FIG. 3. Element 32 is constituted by a U-shaped spring frictionally and removably located against the inner surface of upper wall 24 of casing 12, as seen in FIG. 2. The magnetic flux does not leak out of the motor and all the magnetic flux generated works upon the rotor 36 as effective magnetic flux, thus increasing the efficiency of the motor to a marked extent, as the rotor is caused to rotate forcefully.

A rotor or armature 36 is adapted to be rotatably received within the casing 12. As here shown, the rotor comprises triangular core means 38 provided with three pole pieces 40 mounted on a shaft 42. Suitable windings 44 are provided on the core means. The armature also includes a three-section commutator 46 having the three spaced commutator segments 48 mounted on a plastic core 55.

Pursuant to an important aspect of the present invention, avoidance of irregularity of the position of the commutator and thus exact centering of the shaft are effected to obviate inconsistent operation which would otherwise disadvantageously affect the speed and current drain of the motor, thereby assuring friction-free and smooth and precise working operation. This is achieved by providing a molded triangular element 50 formed of non-magnetic material, preferably a suitable plastic, on the shaft 42.

The element 50 is adapted to be received as an insert in a complementary triangular recess 52 defined in an integral plastic end piece 54 provided at one end of the commutator core 55.

The end piece 54 also mounts terminal elements 56 of the commutator segments, for conveniently connecting the windings 44 to the commutator segments. The commutator is provided also with a second plastic end piece 58 at the other end thereof.

In order to mount the rotor in position within the casing, the end wall 14 is provided with a bearing 60 which receives one end of shaft 42 and the closure cap 18 is provided with a bearing 62 which receives the other end of the shaft, as best shown in FIG. 2. It will be understood that with the shaft mounted in both bearings and with the triangular rotor insert 50 received in the triangular recess 52 of the commutator, said parts having an exact interfit to provide an interlocking action, the rotor and commutator are keyed together and positioned in the exact center of the casing to insure friction free, consistent motor operation.

A pair of brushes 64—64 are mounted on a plastic support 66. One casing wall 24 is provided with a cutout 68 adapted to receive the support 66, the latter having portions 70—70 adapted to overlie the wall 24 adjacent the cut-out 68, as best seen in FIG. 4.

Bendable tabs 72—72 of the casing are adapted to overlie the support 66, to retain the latter in position, as best shown in FIG. 2. With the support in operative position, the brushes 64—64 are in wiping engagement with the commutator, as best shown in FIG. 4. The brushes are provided with wire terminals 74—74 which project from the support.

Referring now to FIGS. 7–11 in detail, there is shown another embodiment of the present invention, similar parts being designated with the same reference numerals.

Pursuant to the present embodiment, there is shown a miniature electric motor 10A having a tubular housing or casing 12A, which is circular in cross-section, preferably formed of a suitable metal. The casing is closed at one end thereof by an integral end wall 14A. The other end 16A of the casing is open and is adapted to receive a closure cap 18A, preferably formed of plastic or other suitable material. For this purpose the casing is provided with bendable tabs 20A—20A adapted to be bendably received in recesses 22A—22A defined in cap 18A, as best shown in FIG. 10.

Permanent magnets 28A—28A are mounted in confronting opposition on the inner surface of the casing 12A, being retained in position by recessed wall portions 30A which engage in complementary recesses formed in the magnet and by retainer elements 32A and 34A, as best shown in FIG. 9. The magnets are polarized as indicated in FIG. 9.

A rotor or armature 36A is adapted to be rotatably received within the casing 12A. As here shown, the rotor comprises triangular core means 38A, provided with three pole pieces 40A, mounted on a shaft 42A. Suitable windings 44A are provided on the core means. The armature also includes a three-section commutator 46A having three spaced commutator segments 48A mounted on a plastic core 55A.

In the present embodiment also, correct alignment and position of the commutator and exact centering of the shaft are effected to obviate inconsistent operation which affects the speed and current drain of the motor and to assure friction-free consistent operation.

This is achieved by providing a molded triangular element 50A formed of non-magnetic material, preferably a suitable plastic, on the shaft 42A. The element 50A is adapted to be received as an insert in a complementary triangular recess 52A (FIG. 11) defined in an integral plastic end piece 54A provided at one end of the commutator core 55A. The end piece 54A also mounts terminal elements 56A of the commutator segments for conveniently connecting the windings 44 to the commutator segments.

In order to mount the rotor in position within the casing, the end wall 14A is provided with a bearing 60A which receives one end of shaft 42A and the closure cap 18A is provided with a bearing 62A which receives the other end of the shaft, as best shown in FIG. 8. It will be understood that with the shaft mounted in both bearings and with the triangular rotor insert 50A received in the triangular recess 52A of the commutator, said parts having an exact interfit, the rotor and commutator are keyed together and positioned in the exact center of the casing to insure friction free, consistent motor operation.

Pursuant to a feature of the present embodiment, a pair of brush means 64A—64A are mounted by the closure cap 18A. More specifically, cap 18A is provided with opposing bores 76—76. A metallic sleeve 78 is mounted in each bore 76. A brush 80 is slidably mounted in each sleeve being biased into engagement with the commutator by a compression spring 82 seated in each sleeve between the brush 80 and a metallic clip 84 engaged in a complementary formation 86 on cap 18A, as best shown in FIG. 10. Each clip 84 is provided with a wire terminal 84a.

It will be noted that in both embodiments the brush means are accessible externally of the casing.

From the foregoing disclosure it ensures that the miniature motor according to FIGS. 1–6 and the motor revealed in FIGS. 7–11 is of highly simplified construction, all or most of the parts of the motor being inserted into the motor housing only from one end thereof. While in motor of FIG. 1 the brush means are introduced from the top of the housing into the interior thereof and for ready removal therefrom, the motor of FIG. 8 offers a further advantage, in that the commutator brush means are supported by the closure cap or cover and that the commutator itself is also located adjacent said cap on the respective shaft end. This latter construction affords further facilities in assembling and disassembling the motor parts and their connection with the motor housing.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A miniature electric motor comprising a hollow casing closed at one end and open at the other end thereof, permanent magnets disposed in confronting opposition on the inner surface of said casing, said casing including spaced abutments against which one end of each magnet respectively is disposed, resilient means biasing the opposite ends of said magnets toward said respective abutments, said casing further including an abutment on each side against which a side edge of said magnets are respectively located, a removable cap to close the open end of said casing, a rotary shaft mounted within said casing, one end of the shaft being journalled in the closed end of said casing and the other end of said shaft being journalled in said cap, a rotor provided on said shaft in spaced magnetic relation with said permanent magnets, a commutator provided on said shaft, brush means for said commutator accessible externally of said casing, said casing having an aperture defined therein, and a support member mounted in said casing and overlying said aperture, said brush means being mounted on said support and extending into the interior of said casing to engage said commutator.

2. A miniature electric motor comprising a hollow casing closed at one end and open at the other end thereof, permanent magnets disposed in confronting opposition on the inner surface of said casing, said casing including spaced abutments against which one end of each magnet respectively is disposed, resilient means biasing the opposite ends of said magnets toward said respective abutments, said casing further including an abutment on each side against which a side edge of said magnets are respectively located, a removable cap to close the open end of said casing, a rotary shaft mounted within said casing, one end of the shaft being journalled in the closed end of said casing and the other end of said shaft being journalled in said cap, a rotor provided on said shaft in spaced magnetic relation with said permanent magnets, a commutator provided on said shaft, and brush means for said commutator provided on said cap and accessible externally of said casing.

3. A miniature electric motor comprising a hollow casing closed at one end and open at the other end thereof, permanent magnets disposed in confronting opposition on the inner surface of said casing, said casing including spaced abutments against which one end of each magnet respectively is disposed, resilient means biasing the opposite ends of said magnets toward said respective abutments, said casing further including an abutment on each side against which a side edge of said magnets are respectively located, a removable cap to close the open end of said casing, a rotary shaft mounted within said casing, one end of the shaft being journalled in the closed end of said casing and the other end of said shaft being journalled in said cap, a rotor provided on said shaft in spaced magnetic relation with said permanent magnets, a commutator provided on said shaft, and brush means for said commutator provided on said cap and accessible externally of said casing, said cap having opposing bores defined therein, said brush means comprising metallic sleeves provided in said bores, brushes slidably mounted in said sleeves, and means biasing said brushes to engage the commutator.

4. A miniature electric motor comprising a hollow casing closed at one end and open at the other end thereof, permanent magnets disposed in confronting opposition on the inner surface of said casing, said casing including spaced abutments against which one end of each magnet respectively is disposed, resilient means biasing the opposite ends of said magnets toward said respective abutments, said casing further including an abutment on each side against which a side edge of said magnets are respectively located, a removable cap to close the open end of said casing, a rotary shaft mounted within said casing, one end of the shaft being journalled in the closed end of said casing and the other end of said shaft being journalled in said cap, a rotor provided on said shaft in spaced magnetic relation with said permanent magnets, a commutator provided on said shaft, and brush means for said commutator on said cap accessible externally of said casing, said cap having opposing bores defined therein, said brush means comprising metallic sleeves provided in said bores, brushes slidably mounted in said sleeves, means biasing said brushes to engage the commutator, and metallic clips overlying said sleeves for abutment by springs.

5. A miniature electric motor comprising a hollow casing closed at one end and open at the other end thereof, permanent magnets disposed in confronting opposition on the inner surface of said casing, said casing including spaced abutments against which one end of each magnet respectively is disposed, resilient means biasing the opposite ends of said magnets toward said respective abutments, said casing further including an abutment on each side against which a side edge of said magnets are respectively located, a removable cap to close the open end of said casing, a rotary shaft mounted within said casing, one end of the shaft being journalled in the closed end of said casing and the other end of said shaft being journalled in said cap, a rotor provided on said shaft in spaced magnetic relation with said permanent magnets, a commutator provided on said shaft, and brush means for said commutator on said cap accessible externally of said casing, said cap having opposing bores defined therein, said brush means comprising a metallic sleeve for each brush, a spring in each sleeve biasing said brush to engage the commutator, metallic clips overlying said sleeves for abutment by said springs, and wire terminals provided on said clips.

References Cited by the Examiner
UNITED STATES PATENTS

| | | | |
|---|---|---|---|
| 2,453,101 | 11/48 | Schulz | 310—46 |
| 2,465,446 | 3/49 | Gorfin et al. | 310—46 |
| 2,513,227 | 6/50 | Wylie | 310—154 |
| 2,812,454 | 11/57 | Buck | 310—46 |
| 2,894,156 | 7/59 | Kent | 310—239 |
| 2,939,024 | 5/60 | Mabuchi | 310—46 |

FOREIGN PATENTS

| | | |
|---|---|---|
| 1,182,772 | 1/59 | France. |

MILTON O. HIRSHFIELD, *Primary Examiner.*